(12) United States Patent
Anderson

(10) Patent No.: US 7,309,373 B2
(45) Date of Patent: Dec. 18, 2007

(54) METHOD OF MAKING A CERAMIC BODY OF DENSIFIED TUNGSTEN CARBIDE

(75) Inventor: Linwood Anderson, Roscoe, IL (US)

(73) Assignee: Cerbide Corporation, Clifton Park, NY (US)

( * ) Notice: Subject to any disclaimer, the term of this patent is extended or adjusted under 35 U.S.C. 154(b) by 309 days.

(21) Appl. No.: 11/197,183

(22) Filed: Aug. 3, 2005

(65) Prior Publication Data

US 2007/0235908 A1    Oct. 11, 2007

Related U.S. Application Data

(60) Division of application No. 10/351,701, filed on Jan. 27, 2003, now abandoned, which is a continuation-in-part of application No. 10/008,806, filed on Nov. 13, 2001, now Pat. No. 6,843,824.

(60) Provisional application No. 60/333,018, filed on Nov. 6, 2001.

(51) Int. Cl.
*B22F 3/12*    (2006.01)
*C22C 29/08*    (2006.01)

(52) U.S. Cl. .............. 75/18; 419/33; 419/35; 419/37; 419/38

(58) Field of Classification Search ............... 419/18, 419/33, 35, 37, 38
See application file for complete search history.

(56) References Cited

U.S. PATENT DOCUMENTS

| | | | |
|---|---|---|---|
| 3,383,748 A | 5/1968 | Jones et al. ............... 29/95 |
| 3,647,401 A * | 3/1972 | Meadows ............... 75/229 |
| 3,660,050 A | 5/1972 | Iller et al. ............... 29/182.8 |
| 3,802,847 A | 4/1974 | Hara et al. ............... 23/279 |
| 4,056,871 A | 11/1977 | Bator ............... 407/114 |
| 4,087,193 A | 5/1978 | Mundy ............... 407/114 |
| 4,126,652 A | 11/1978 | Oohara et al. ............... 264/29.6 |
| 4,146,379 A | 3/1979 | Copley et al. ............... 65/18 |
| 4,162,301 A | 7/1979 | Hamling ............... 423/440 |
| 4,247,232 A | 1/1981 | McCreery et al. ............... 407/114 |
| 4,256,496 A | 3/1981 | Brandstatter ............... 407/114 |
| 4,318,645 A | 3/1982 | McCreery ............... 407/114 |
| 4,340,324 A | 7/1982 | McCreery ............... 407/114 |
| 4,664,899 A | 5/1987 | Kimmel et al. ............... 423/440 |
| 4,744,943 A | 5/1988 | Timm ............... 419/10 |
| 4,753,678 A | 6/1988 | Maruyama et al. ............... 75/238 |
| 4,828,584 A | 5/1989 | Cutler ............... 51/307 |
| 4,945,073 A | 7/1990 | Dubensky et al. ............... 51/93 |
| 5,026,960 A | 6/1991 | Slutz et al. ............... 219/69.17 |
| 5,089,447 A | 2/1992 | Timm et al. ............... 501/87 |
| 5,141,367 A | 8/1992 | Beeghly et al. ............... 407/119 |
| 5,215,945 A | 6/1993 | Dubensky et al. ............... 501/94 |
| 5,330,296 A | 7/1994 | Beehgly et al. ............... 407/114 |
| 5,334,561 A | 8/1994 | Matsui et al. ............... 501/87 |
| 5,350,258 A | 9/1994 | Beeghly et al. ............... 407/114 |
| 5,351,588 A | 10/1994 | Penoza ............... 83/13 |
| 5,380,688 A | 1/1995 | Dunmead et al. ............... 501/87 |
| 5,434,112 A | 7/1995 | Matsui et al. ............... 501/87 |
| 5,476,025 A | 12/1995 | Beeghly et al. ............... 407/119 |
| 5,500,289 A | 3/1996 | Gavish ............... 428/551 |
| 5,563,107 A | 10/1996 | Dubensky et al. ............... 501/87 |
| 5,612,264 A | 3/1997 | Nilsson et al. ............... 501/87 |
| 5,628,590 A | 5/1997 | Beehgly et al. ............... 407/114 |
| 5,658,678 A | 8/1997 | Stoll et al. ............... 428/552 |
| 5,681,783 A | 10/1997 | Nilsson et al. ............... 501/87 |
| 5,716,170 A | 2/1998 | Kammermeier et al. ............... 408/145 |
| 5,746,803 A | 5/1998 | Dunmead et al. ............... 75/351 |
| 5,752,155 A | 5/1998 | Gates et al. ............... 419/5 |
| 5,762,538 A | 6/1998 | Shaffer ............... 451/36 |
| 5,773,735 A | 6/1998 | Dubensky et al. ............... 75/240 |
| 5,827,017 A | 10/1998 | Tagstrom et al. ............... 407/116 |
| 5,885,372 A | 3/1999 | Seegopaul ............... 148/237 |
| 5,919,428 A | 7/1999 | Gao et al. ............... 423/440 |
| 5,942,204 A | 8/1999 | Dunmead et al. ............... 423/440 |
| 6,007,598 A | 12/1999 | Dunmead et al. ............... 75/236 |
| 6,027,808 A | 2/2000 | Aoki et al. ............... 428/408 |
| 6,033,789 A | 3/2000 | Saveker et al. ............... 420/556 |
| 6,096,436 A | 8/2000 | Inspektor ............... 428/469 |
| 6,113,668 A | 9/2000 | Kneringer et al. ............... 117/30 |
| 6,495,115 B1 | 12/2002 | Dunmead et al. ............... 423/440 |
| 6,617,271 B1 | 9/2003 | Kodash et al. ............... 501/87 |

FOREIGN PATENT DOCUMENTS

| | | |
|---|---|---|
| EP | 0 360 567 | 3/1990 |
| EP | 0 476 632 | 3/1992 |
| JP | 10156607 A | 6/1998 |

OTHER PUBLICATIONS

A.G. Evans (1979). "Impact Damage Mechanics: Solid Projectiles" *Treatise on Materials Science and Technology* 16: 63-65.
J.K. Lancster (1987). "Abrasive Wear," *Tribology in Particulate Technology*, p. 329.
E.A. Almond et al. (1987). "Some characteristics of Very-Fine-Trained Hardmetals" *Metal Powder Report* 42 No. 7/8.
Junichi Hojo, et al. (1980). "The Sinterability of Ultrafine WC Powders Obtained by a CVD Method" *Journal of Materials Science*, pp. 2335-2344.

* cited by examiner

*Primary Examiner*—Roy King
*Assistant Examiner*—Ngoclan T. Mai
(74) *Attorney, Agent, or Firm*—Mintz, Levin, Cohn, Ferris, Glovsky and Popeo, P.C.

(57) ABSTRACT

A method of making tungsten carbide and a method of making a densified tungsten carbide-containing ceramic body with a transverse rupture strength greater than 300,000 psi are disclosed.

38 Claims, No Drawings

METHOD OF MAKING A CERAMIC BODY OF DENSIFIED TUNGSTEN CARBIDE

CROSS REFERENCE TO RELATED APPLICATIONS

This application is a divisional of patent application U.S. Ser. No. 10/351,701, filed Jan. 27, 2003 now abandoned, which is a continuation-in-part to U.S. patent application Ser. No. 10/008,806 filed Nov. 13, 2001 now U.S. Pat. No. 6,843,824, which claims benefit of U.S. provisional application Ser. No. 60/333,018, filed Nov. 6, 2001, each disclosures of which is herein incorporated by reference in its entirety.

FIELD OF THE INVENTION

The present invention relates to ceramic bodies comprised of polycrystalline tungsten carbide metal, the method of making these ceramic bodies, and the ceramic material of which the bodies are made.

BACKGROUND OF THE INVENTION

It took metallurgists one hundred and fifty years after Scheele's discovery of "tungsten" in 1781, to develop and then apply tungsten carbide ("WC") cermets in industry. Cermets are a composite material consisting of a combination of metallic and ceramic materials. The most common cermets are the cemented carbides, composed of an extremely hard ceramic (e.g., WC, TiC), bonded together by a ductile metal such as cobalt or nickel. Many different types of polycrystalline WC-based powders (e.g., U.S. Pat. Nos. 4,664,899; 5,746,803; 6,007,598) and densified polycrystalline ceramics (e.g., U.S. Pat. Nos. 4,828,584; 5,563,107; 5,612,264; 5,681,783; 6,033,789) have been described.

Today, the main use of tungsten (in the form of WC) is in the manufacture of cemented carbide. Due to the wide application of cemented carbide products in engineering, electronics, mining, manufacturing, aerospace, and medicine, the annual world market demand for cemented carbide now exceeds some 30,000 tons. In manufacturing, for example, durable and effective cutting tools for high-speed machining have significant commercial applications. The material comprising these cutting tools should have a high heat hardness, a high transverse rupture strength, and fracture toughness. Further, these cutting tools are designed to control the flow of "chips" which are formed in the machining process, and, to reduce the cutting forces.

Polycrystalline WC-based cermets have shown two fundamental limitations. Under certain conditions, WC-based cermets lack toughness (i.e., they are brittle in response to mechanical shock), and at the high temperatures caused by faster feed rates, they undergo plastic deformation. Polycrystalline WC is, therefore, disfavored in the preparation of densified ceramic bodies for select applications (e.g., cutting tool inserts with chip control) because WC is not thought to have the needed toughness and wear resistance.

These limitations have also impeded the machining rate of titanium alloys. Specifically, titanium and associated alloys have been used in the aerospace field extensively, due to their superior strength to weight ratio and exceptional corrosion resistance. Although the use of titanium alloy has increased in recent years, machining speeds have remained the same, unlike, for example, high nickel alloy materials, where machine speeds have increased with the advent of silicon nitrides and whisker reinforced ceramics (from 125 sfm to 600-1000 sfm). In contrast, the machining speeds for titanium alloys have remained at around 250 sfm or lower for the past 20 years.

Machining is normally accomplished with cemented tungsten carbide tools (sub micron to 1-5 micrometer WC grain size) with five to six weight percent cobalt made by conventional liquid phase sintering at temperatures near 1400 degree(s) C. in vacuum or hydrogen. Machining speeds for such tools are still between 120 sfm and 300 sfm when machining titanium with depths of cut between 0.020 and 0.050 per revolution. This is very slow compared to machining of other metals and represents a barrier that many tool developers have sought to overcome. Numerous cemented carbides, ceramic-coated cemented carbides, and available ceramics have all been tested with limited success in order to find a cutting tool that can machine titanium alloys at higher speeds than WC-Co tools. The exception to these results is polycrystalline WC, which has shown promise for machining titanium. See U.S. Pat. No. 4,828,582 and J. Kertesz, et al., "Machining Titanium Alloys with Ceramic Tools," J. Metals, (1988), 50-51.

In general, hardness of the cermets, i.e., wear resistance, strength, and toughness, can be changed by WC grain size, cobalt content, and by other carbides present. In formulating these materials, however, there is a tendency that if wear resistance is heightened, fracture resistance is lowered. Conversely, if fracture resistance is heightened, wear resistance is lowered. Accordingly, in the design of densified polycrystalline WC-containing ceramic bodies, it has been a challenge to improve one material property without adversely affecting another material property by adding cobalt, or another iron group, that will plastically deform in high heat, e.g., high-speed machining.

SUMMARY OF THE INVENTION

Tungsten Carbide Powder and Method of Making

A method of producing a WC powder is included in the present invention. In one embodiment, the method of producing the WC powder comprises mixing tungsten particles with carbon powder; ball milling the mixture; adding a grain growth inhibitor; transferring the milled mixture to a refractory crucible; and carburizing the mixture under conditions sufficient to create WC particles.

In one embodiment, the initial tungsten particles are selected from a group consisting of metatungstate, pertungstate, and tungstic acid. Preferably, the mixture comprises 94 parts by percent tungsten and 6 parts by percent carbon. Typically, the powder is produced by milling the mixture for at least about 20 hours. Preferably vanadium carbide or chromium carbide, or a combination thereof, are typically used as a grain growth inhibitor. While the grain growth inhibitor may be added after the milling process, it is preferably added before the milling process is complete. The milled powder is heated to between about 1475° C. and about 1700° C. (preferably 1600° C.) in an atmosphere suitable to yield formation of WC particles.

In one embodiment, the method of producing a WC powder yields a powder comprising fine-grained WC and less than about 6.09 weight percent ("wt %") carbon (i.e., substoichiometric) and less than 0.6 wt % cobalt. Preferably, the average diameter of the manufactured WC grains is less than about 5 μm. In a preferred embodiment, WC grains between about 0.1 μm and about 0.75 μm are preferred. The WC powder may be used to form densified ceramic bodies of surprisingly high transverse rupture strength that exceeds about 300,000 psi as described below.

Densified Ceramic Body and Method of Making

This invention provides densified ceramic bodies composed of essentially dense, fine-grained WC. The invention also provides a method that yields a WC-containing ceramic body with sub-micron metal grains and a surprisingly high transverse rupture strength that exceeds about 300,000 psi. The densified ceramic bodies described herein may be formed into a variety of shapes including cutting tools, inserts, router bits and knives.

In one embodiment, the method of manufacturing the densified ceramic bodies comprises milling a WC powder with a suitable organic milling fluid for more than 71 hours, such that rough edges on the particles in the powder are reduced during the process, cobalt is added to the milling mixture relatively early in the milling process (preferably in the first 5% to 10% onto the total milling time) to swedge cobalt onto the particles in the powder. The milled powder and solvent slurry is then contacted with a mixture comprising paraffin-type wax and an ester-type wax and granulated into substantially spherical granules of WC particles and said paraffin-type and ester-type wax. The granulated powder is then compacted under conditions sufficient to form a preform ceramic body having 40% to 60% density of pure WC. Subsequently, the paraffin-type wax and ester-type wax are removed from the preform ceramic body at elevated temperature, thereby forming a debindered population of WC particles. Finally, the debindered preform ceramic body is sintered to form a densified WC-containing body. Debindering and sintering may be accomplished in a single cycle.

In another embodiment, a densified ceramic body is made by ceramic processing techniques that result in a ceramic body which has a density of greater than 95% of its theoretical density with substantially all grains having an average size of 0.001 µm to 0.6 µm and a transverse rupture strength of at least about 300,000 psi. Preferably, the densified ceramic body has a transverse rupture strength of at least about 300,000 psi, a Rockwell A-scale hardness of up to about 96 at 20° C. (preferably between about 95 and about 96 at 20° C.) and a Rockwell A-scale hardness of greater than 90 at 800° C. The densified ceramic body has cobalt present from about 0.01 wt % to about 1 wt % (preferably less than about 0.6 wt %) and includes at least 98 wt % WC. Further, the average WC particle size is less than about 1.0 µm (preferably between about 0.001 µm and about 0.6 µm). Tungsten-bound carbon is present in at least about 5.5 wt % and the ceramic body has a density of at least about 95% of its theoretical density (preferably 99% of its theoretical density).

The polycrystalline fine-grained WC ceramic material of this invention is useful in applications where a tough, wear-resistant material is required, e.g., bearings, balls, valve seats, pistons, and mill liners; in applications where a non-brittle high density material is required, e.g., for counterweights in aircraft, for darts, or for weights in golf club heads; and, it is also useful in armament applications, e.g., as high velocity penetrators in anti-tank weapons.

Coatings comprising TiC, TiN, $TiC_xN_{1-x}$ and $Al_2O_3$, SiC, $Si_3N_4$ may also be applied to any of the densified ceramic body embodiments described above.

The densified ceramic bodies of this invention are particularly useful as wear parts in high-speed manufacture techniques using various cutting tools, e.g., drills; Reuters; taps; milling cutters; gear cutters; saw blades; water jet nozzles, as well as for punches and dies. These densified ceramic bodies may be used to machine a wide variety of materials, including the machining of titanium metals and alloys of titanium which have a very high content of titanium, cast iron, aluminum, high nickel alloys, stainless steels, wood machining-cutting, and high-speed machining of steels.

DETAILED DESCRIPTION OF THE INVENTION

Tungsten Carbide Powder and Method of Making

The present invention provides for a method of manufacturing a tungsten carbide powder that contains carbon at preferably less than about 6.09 wt %; cobalt at preferably less than about 0.6 wt %; and a grain growth inhibitor selected from a group consisting of vanadium carbide, chromium carbide, titanium carbide, tantalum carbide, and molybdenum carbide. A ceramic powder is made by ball-milling a mixture of tungsten particles and carbon powder. A grain growth inhibitor is added during the ball-milling process or thereafter. The milled powder is subsequently transferred to a refractory crucible and carburized to form WC particles. The initial tungsten powder may be selected from a group consisting of metatungstate, pertungstate, and tungstic acid, and the grain growth inhibitor may be added as metals or oxides which may be co-carburized with the WC.

Carbon powder is added to the tungsten carbide powder to less than 6.13 wt % (i.e., substoichiometric) or in an amount that produces a final composition after processing that is substoichiometric in carbon. The mixture may be comprised of 94 parts by percent tungsten and 6 parts by percent carbon but a carbon powder to between 5.9 wt % and 6.09 wt % is preferred. Cobalt is added to less than 0.6 wt % but cobalt at a final concentration to between 0.25 wt % and 0.5 wt % is preferred. Either chromium carbide or vanadium carbide or a combination of chromium carbide and vanadium carbide may be used as the grain growth inhibitor, however, vanadium is the preferred grain growth inhibitor. The milling of the powder is conducted for at least about 20 hours.

Carburization may be obtained by heating the metal mixture in a refractory crucible under nonreducing conditions in a suitable furnace to temperatures exceeding 800° C. Heating the metal mixture to between 1425° C. and 1700° C. is preferred. Heating the metal mixture to 1600° C. is most preferred. Any nonreducing conditions suited to the carburization of tungsten may be used. A nonreducing environment of nitrogen in the absence of vacuum is preferred.

The average diameter of the WC ceramic particles in the manufactured ceramic powder may be 5 µm or less. The ceramic grains between about 0.1 µm and about 0.75 µm are preferred. The WC powder may be used to form densified ceramic bodies of surprisingly high transverse rupture strength that exceeds about 300,000 psi as described below.

Densified Ceramic Body and Method of Making

The present invention provides for a densified ceramic body with a transverse rupture strength exceeding about 300,000 psi and molded from WC powder. The ceramic body may be shaped as a cutting tool, router bit, knife, water jet nozzle or insert (for example). Preferably the densified ceramic body is a ceramic cutting tool. More preferred is a ceramic cutting tool for high-speed machining that includes a cutting edge, a rake face with a chip control groove surface, a flank face and the cutting edge that is formed at the juncture of the flank face and the rake face. The ceramic body may be used to cut metal or wood.

The invention also provides that a densified ceramic body formed by milling a population of WC particles with organic fluid and milling balls under conditions sufficient to reduce the rough edges on particles in the powder and to swedge (i.e., bond by pounding) 0.3 wt % to 0.35 wt % cobalt onto the particles in the powder; contacting the population of granulated WC particles with a mixture comprising a paraffin-type wax and an ester-type wax; spraying the resulting mixture via a nozzle into a gas filled vessel under conditions sufficient to remove the organic solvent and leave spherical granules of the paraffin-type and ester-type wax containing WC particles; molding the granule material into a preform body; then removing the paraffin-type wax and ester-type wax from said preform body, thereby forming a debindered population of WC particles. The debindered WC particles are then sintered, thereby forming a densified WC-containing ceramic body with 0.26 wt % to 0.6 wt % cobalt.

Tungsten carbide ceramics of the present invention can be tailored for use in particular applications by an appropriate milling of the WC powder to reduce grain size and by controlling densification conditions to control grain growth. Desirable starting powder grain sizes fall within a range of from greater than about 0.001 µm to about 5 µm. The range, depending on the application, is preferably from about 0.1 µm and about 0.75 µm. Starting powder grain sizes of less than 5 µm provide densified ceramic bodies having excellent properties.

Tungsten carbide powders having an average grain size of less than or equal to 5 µm are commercially available (Alldyne Powder Technology, West Huntsville, Ala., USA, for example). One such powder, Mach 600, has a nominal average grain size of 0.8 µm to 1.1 µm and includes a small amount of vanadium carbide as a grain growth inhibitor. Attriting such a powder simultaneously reduces the average grain size, reduces grain size distribution, and more uniformly disperses the grain growth inhibitor. Even in the absence of a grain growth inhibitor, attrition milling provides the benefits of smaller average particle size and a narrower particle size distribution.

Processing of a WC powder to the desired particle distribution and shape may entail repeated cycles of ball-milling the WC powder with organic solvent followed by spray-drying. The range, depending on the application, is preferably from about 71 hours total milling time to more than about 400 hours of total milling time. A milling time between about 150 hours and about 350 hours is preferred. A milling time of between about 220 hours to about 240 hours is most preferred. Cobalt is added to the milling mixture at between about 5% and about 10% into the total milling time to swedge cobalt onto the WC particles in the powder. Further, any organic solvent compatible with the milling of WC powder, e.g., n-heptane, may be used to ball-mill the WC powder to a reduced grain size. The use of n-heptane is preferred. Following milling, the WC powder is granulated into a spherical shape by conventional processes such as spray drying or mix pelletization.

Alternatively, the WC powder may have these characteristics as synthesized. As a further alternative, powders with even larger average grain sizes may be used, provided they are attrited/milled under conditions sufficient to reduce the average grain size to less than or equal to about 0.6 µm. These powders necessarily require longer size reduction procedures and may, as a consequence, pick up additional quantities of impurities from media used to promote size reduction.

Tungsten powders used in the present invention need not be 100% pure. They may contain other materials, so long as the other materials do not interfere with densification of the powder or adversely affect physical properties of the resultant densified ceramic bodies. Examples of "other materials" include cobalt, iron, nickel, carbon, silicon, $W_2C$, TiC, $Mo_2C$, TiN, SiC, or other refractory materials. The other materials may, for example, be present as a result of powder synthesis procedures or as residue from milling operations.

Cobalt may be present from about 0.01 wt % to about 1 wt %. Preferably, cobalt is present at less than 0.6 wt %. In addition to the other materials, the WC powders have an oxygen content that varies inversely with particle size. Thus, as particle size decreases, oxygen contents tend to increase. However, the oxygen content should be maintained at a level that preferably does not interfere with densification of the powder or adversely affect physical properties of resultant densified ceramic bodies.

In another aspect of the present invention, sintering of the preform ceramic body is accomplished under a vacuum and the temperature is increased at a rate of at least about 6° C. per minute to at least about 1400° C. and maintained at this temperature for at least about 45 min, and at least about 28 KSI inert gas pressure is applied and held for at least about 45 min. In yet another aspect, the inert gas is selected from a group consisting of nitrogen, argon, helium, neon, krypton, and xenon.

After the milling process, the attrited WC powder is bound together, preferably with wax or a mix of waxes, as described more fully below. More specifically, a binder such as wax is added to the powder to facilitate molding into a die. Preferably, the total binder content of the WC powder is less than about 5 wt %. More preferably the total binder content of the WC powder is about 2.25 wt %. The binder may contain a mixture of paraffin-type and ester-type waxes. A paraffin-type wax is a hydrocarbon that consists of saturated straight, branched and/or cyclic hydrocarbon chains. Paraffin-type wax based on mineral oil, may contain about 20 to 50 carbon atoms whereas other, particularly synthetic, paraffin-type waxes, may contain up to 100 carbon atoms. Paraffin-type waxes include, e.g., petroleum wax such as solid paraffin or microcrystalline wax, a hydrocarbon wax such as liquid paraffin or white soft paraffin. On the other hand, ester-type waxes, as defined here, are essentially esters in chemical structure and may be found in naturally occurring mixtures. Ester-type waxes include, however, synthetic or partially synthetic waxes or mixtures of waxes based on naturally occurring ester-type waxes.

Preferably, beeswax, montan wax, carnauba wax, or spermaceti is selected as the ester-type wax. More preferable, beeswax is selected as the ester-type wax. It is also preferable to add the paraffin-type to greater than 0.1 wt % WC powder and to add the ester-type wax to less than approximately 5 wt % WC powder. In one embodiment, paraffin-type is added to 2 wt % of the WC powder and beeswax is added to 0.25 wt % of the WC powder prior to molding the powder into a preform ceramic body.

Binding the attrited WC powder with wax aids in molding the material into a preform ceramic body that can be densified using any of a variety of densification techniques such as pressureless or low pressure sintering, hot pressing, hot isostatic pressing and rapid omnidirectional compaction. Densification is preferably accomplished by hot isostatic pressing. It is also preferable that the in situ debindering of the preform ceramic body is accomplished by heating the preform ceramic body, which is under a pressure of inert gas, at a rate of at least about 3.5° C. per min to at least about 280° C. and held at this temperature for at least about 45 min; and then increasing the temperature at a rate of at least about 1.5° C. per minute to at least about 380° C. and held at this temperature for at least about 45 minute; and then increasing the temperature at a rate of at least about 6° C. per min to at least about 480° C. and maintained at this temperature for at least about 3 min. Inert gas may be a pure inert gas or a mixture of inert gases selected from nitrogen, argon, helium, neon, krypton, and xenon.

In situ debindering of the preform ceramic body may be accomplished by increasing the temperature of the preform ceramic body in a controlled manner. For example, heating the preform ceramic body at a rate of 3.75° C. per min to 300° C. and maintaining this temperature for 1 hour before increasing the temperature to 400° C. at a rate of 2° C. per min. Further, the preform ceramic body may be maintained at 400° C. for 1 hour before increasing the temperature to 500° C. at a rate of 8° C. per min. It is preferable that debindering and sintering the ceramic body is performed in a single cycle.

Sintering the preform ceramic body may be accomplished by placing the debindered preform ceramic body under vacuum and then controlling the temperature. For example, a vacuum may be applied to the preform ceramic body and the temperature increased at a rate of at least about 6° C. per minute to at least about 1580° C. and maintained at this temperature for at least about 45 min. The sintering process may be completed by releasing the vacuum and applying a pressure of inert gas to the ceramic body. For example, at least about 28 KSI inert gas pressure can be applied and held for at least about 45 min. Inert gas may be a pure inert gas or a mixture of inert gases selected from nitrogen, argon, helium, neon, krypton, and xenon. It is preferred that debindering and sintering be performed in a single cycle.

The densified WC body produced by this method has a transverse rupture strength of 300,000 psi, a Rockwell A-scale hardness of up to 96 at 20° C. and a Rockwell A-scale hardness of greater than 90 at 800° C. A densified ceramic body with a transverse rupture strength between about 300,000 psi and about 590,000 psi is suitable. Preferably, the densified ceramic body has a transverse rupture strength of at least about 325,000 psi, a Rockwell A-scale hardness of between about 94 and about 96 at 20° C. and a Rockwell A-scale hardness of greater than 90 at 800° C.

The average WC particle size in the densified ceramic body is less than 1 μm. A WC particle size between about 0.001 μm and about 0.6 μm is suitable. A WC particle size between about 0.1 μm and about 0.45 μm is preferred. Further, a ceramic body with a WC-bound carbon content of between about 5.5 wt % and 6.09 wt % is preferred. A substoichiometric WC-bound carbon content of between about 5.9 wt % and 5.98 wt % is most preferred. A stoichiometric carbon content is 6.13 wt %.

A densified ceramic body that is shaped as a cutting tool is preferred. A cutting tool with chip control is more preferred. The present invention may be utilized with a variety of insert chip control designs, such as those shown in U.S. Pat. Nos. 5,141,367; 4,318,645; 4,340,324; 4,247,232; 4,087,193; 4,056,871 and 3,383,748 and each fully incorporated herein by reference.

The densified ceramic bodies according to embodiments of the present invention may be used as material for any type of wear part, including cutting and grinding tools, dies, machine parts, injectors and industrial water jet nozzles, for example.

Accordingly, the densified ceramic bodies according to the embodiments of the invention have allowed for an increased machine rate of titanium alloys. Generally, titanium machining speeds have stayed the same as they have been for the last 20 years (approximately 250 sfm or lower), because the only tool that has shown greater success has been micro grained carbide cutting tools. Machining high nickel alloys, on the other hand have increased with the advent of silicon nitrides and whisker reinforced ceramics, from 125 sfm to 800-1000 sfm.

However, the present invention allows titanium to be machined at high speeds, typifying an application where high wear resistance, high temperature resistance and fracture toughness are required. Titanium generally includes poor thermal conductivity and high chemical affinity between oxygen, nitrogen, carbon and boron lead. This generally leads to high temperatures at the cutting interface and excessive chemical attack of most cutting materials. Thus, prior art cutting tool materials fail at high speeds.

As is illustrated in the table below, in which the cutting tools comprising the densified ceramic bodies according to the present invention (labeled as "CERBIDE"), include substantial performance increases (e.g., about four to five times the cutting speed of prior art tools) against competitive product. The tools were tested with a positive rake geometry, rather than the negative rake (which is normally used for ceramics), to help demonstrate the excellent toughness properties the present invention has as compared to conventional ceramics.

Positive ground inserts comprised of the material according to the present invention (with and without a hone) have been found to mill titanium and its alloys (Ti-6AL-4V) at speeds up to about 1000 sfm and greater. Moreover, the inventive material generally removed greater than about twice the volume of material at 380 sfm for the same flank wear as micro grained carbide. Greater gains were more prominent at 600 sfm. Cutting tools made of the material according to the present invention may be substituted directly for cemented carbide with performance increases which may be greater than 100% at 400 sfpm, and 200% at 600 sfm. Such speeds are more than double conventional speeds increasing production rates dramatically.

TABLE I

Insert testing

| | | | | | | | Garrett-Customer Material | | | Wear land-flank | | | |
|---|---|---|---|---|---|---|---|---|---|---|---|---|---|
| Manufacturer | Grade Turning | Insert | Edge | SFM | DOC | Feed | Titanium | 1 min | 2 min | 3 min | 4 min | 5 min | 6 min |
| CERBIDE | MACH-300 | SPG-422 | F | 400 | .025 | 0.01 | Ti-BAL-4V | 0.007 | 0.010 | 0.015 | 0.020 | 0.024 | 0.031 |
| Carboloy | 895 | SPG-422 | F | 400 | .025 | 0.01 | Ti-BAL-4V | 0.014 | 0.020 | 0.035 | failure | | |

TABLE I-continued

Insert testing

| Manufacturer | Grade | Insert | Edge | SFM | DOC | Feed | Pratt-Customer Material Waspoloy | Wear land-flank TIC* | |
|---|---|---|---|---|---|---|---|---|---|
| CERBIDE | MACH-414 | RNG-45 | A | 500 | .050 | 0.006 | AMS 5707 | 0.006 | 05:26 |
| Greenleaf | WG-300 | RNG-45 | 5 × 20 | 700 | .050 | 0.006 | AMS 5707 38Rc | 0.030 | 03:41 |

*Time in out

TABLE II

| Automotive Manufacturer | Grade Turning | Insert | Edge | SFM | DOC | Feed | Material Cast Iron | Wear land-flank | | | | | |
|---|---|---|---|---|---|---|---|---|---|---|---|---|---|
| | | | | | | | | 2 min | 4 min | 6 min | 8 min | 10 min | 13 min |
| CERBIDE | MACH-200 | SNG-433 | 8 × 20 | 1140 | .075 | 0.011 | 3000 | 0.005 | 0.005 | 0.006 | 0.007 | 0.006 | 0.009 |
| V.R. Wesson | VR-100 | SNG-433 | 8 × 20 | 1140 | .075 | 0.011 | 3000 | 0.005 | 0.005 | 0.006 | 0.008 | 0.010 | 0.011 |
| V.R. Wesson | VR-100 | SNG-433 | 8 × 20 | 1140 | .075 | 0.011 | 3000 | 0.009 | 0.013 | 0.016 | failure | | |
| Iscar | IS-8 | SNG-433 | 8 × 20 | 1140 | .075 | 0.011 | 3000 | 0.008 | 0.010 | 0.015 | failure | | |
| Kennametal | Kyon-2000 | SNG-433 | 8 × 20 | 1140 | .075 | 0.011 | 3000 | 0.009 | 0.009 | 0.015 | failure | | |

| Manufacturer | Grade | Insert | Edge-prep | SFM | DOC | Feed | Material | # Parts | Wear land-flank |
|---|---|---|---|---|---|---|---|---|---|
| CERBIDE | MACH-413 | CNMP-432GP | A-hone | 2880 | .050 | 0.017 | Cast Iron 3000 | 300 | 0.013 |
| Kennametal | Kyon-3400 | CNGA-432 | 6 × 30 land | 2880 | .050 | 0.017 | Cast Iron 3000 | 300 | 0.015 |
| CERBIDE | MACH-413 | CNMP-432GP | A | 1740 | 0.05 | 0.017 | 3000 | 0.015 | 100 parts |
| Kennametal | Kyon-3400 | CNGA-432 | 6 × 30 | 1740 | 0.05 | 0.017 | 3000 | 0.015 | 100 parts break-age |
| Cerbide | MACH-414 | CNMG-432GP | A | 1000 | 0.01 | 0.012 | Stainless Nitronic 30 | 45Rc | |
| Sandvik | 1025 | CNMG-432MR | A | 400 | 0.01 | 0.012 | Nitronic 30 | | |

The material according to the present invention is also capable of machining other materials at higher than cemented carbide speeds, with significant gains in productivity (cast iron, nodular iron, and other superalloys, for example).

Coatings

U.S. Pat. No. 5,952,102 (to Cutler), herein incorporated by reference, is directed coating binderless tungsten carbides (WC) or WC-Al$_2$O$_3$ ceramic composites with diamond using physical or chemical vapor deposition (PVD or CVD). In addition, Cutler teaches coating tougher cemented carbides with WC, SiC, Mo$_2$C, or other ceramics with a close expansion mach to WC in order to provide a barrier to cobalt diffusion between the diamond and the cemented carbide. Cutler also discusses using physical or chemical vapor deposition (PVD or CVD) to coat densified ceramic bodies with, for example, TiC, TiN, TiC$_x$N$_{1-x}$, and Al$_2$O$_3$ (or combinations thereof).

In the present invention, coatings are used to limit diffusion of oxygen to WC. Specifically, the coating generally reduces the tendency for WC to oxide to WO$_3$, W$_2$O$_3$ (or other oxide) at elevated temperatures. Coatings on the densified ceramics according present invention also increase their chemical compatibility to the work piece, thereby reducing the coefficient of friction between the tool and the work piece. This in turn lowers the temperature of the tool tip.

Coating the WC substrate, however, is not without its drawbacks. For example, the ability for the substrate to dissipate heat is decreased since coating materials are generally lower in thermal conductivity than the WC-Co substrates. Moreover, the strength of the substrate is also lessened by the application of a coating. However, the benefits of improved chemical compatibility of the tool with the work-piece, due to the coating, outweigh any loss in strength and heat dissipation of the tool.

The present invention is not limited to the same coatings that are conventionally used for WC-Co (e.g., TiC, TiN, TiC$_x$N$_{1-x}$, and Al$_2$O$_3$ or combinations thereof), although these coatings generally work well as a diffusion barrier to oxygen transport at cutting tool temperatures. Preferably, coatings according to the present invention include Al$_2$O$_3$, SiC, and Si$_3$N$_4$ (or other oxygen barrier protection materials), which are coated onto a substrate using CVD or PVD. Typical oxygen diffusion coefficients through these materials are generally below $1 \times 10^{-12}$ cm$^2$/s at the tool tip. Thus, the time required to penetrate a 10 μm thick coating would be inconsequential for a cutting tool where lifetime is measured in minutes rather than hundreds of hours.

Silicon carbide (SiC) and silicon nitride (Si$_3$N$_4$) are preferred coatings over Al$_2$O$_3$ due to the their thermal expansion closely matching that of WC and their excellent oxidation protection. These coating materials are also compatible with cast irons, but generally do not work well with steels due to the formation of iron silicides. For steels, $Al_2O_3$ coatings are generally more chemically resistant and thus preferable.

Accordingly, in addition to the preferable coatings of $Al_2O_3$, SiC, and $Si_3N_4$, other coating materials having the following properties may be used: (1) low oxygen diffusivity; (2) equal or slightly lower coefficient of thermal expansion as compared with WC; (3) chemical compatibility with the work-piece (i.e., be unreactive with the work-piece), (4) high thermal conductivity heat dissipation; and (5) a low coefficient of friction when in contact with the work-piece (as in milling, turning, or other machining operations). Selection of a proper coating for a particular application will vary since there are a number of factors to consider including type of work-piece material, machining conditions, tool geometries, coolants, and the like.

Accordingly, using CVD or PVD coating techniques, a coating of from less than about 20 μm, and preferably less than 10 μm may be placed on previously ground or net-shaped WC tools. These inserts or other shaped geometries may have all of the features associated with state-of-the-art cemented carbides, including chip breakers, holes, and negative rakes.

EXAMPLE 1

Mach 600 WC powder (Alldyne Powder Technology, West Huntsville, Ala., USA) was processed to 0.41 μm average particle size by repeated milling and spray-drying as follows. Mach 600 WC powder (lot #63794) having an average grain size of 0.8 μm to 1.1 μm and a vanadium carbide (VC) content of 0.33 wt % was ball-milled with n-heptane for approximately 70 hours. The milling mixture was spray-dried and the attrited powder was recovered. The milling and spray-drying process was repeated as before. After a third cycle of milling, paraffin wax (2 wt %) and beeswax (0.25 wt %) were added during drying of the attrited WC powder to bind the attrited WC powder together. This powder also contained 0.47 wt % cobalt, 0.06 wt % Cr, and 0.03 wt % Fe.

A preform ceramic body was made by cold-dressing the attrited WC powder in steel tooling at 24,000 psi to provide a preform ceramic body having a size of 0.773 inch ("in.") by 0.773 in. by 0.320 in. and having 52.6% of the theoretical density. The preform ceramic body was placed on a layer of coarse WC crystals in a carbon crucible and thermally processed in an AIP sinter vacuum 180° C./30KSI HIP furnace (American Isostatic Presses, Inc., Columbus, Ohio, USA).

In situ debindering of the preform ceramic body was accomplished with slight partial pressure of flowing nitrogen gas as follows. The preform ceramic body was heated under nitrogen at a rate of 3.75° C. per min to 300° C. This temperature was maintained for 1 hour before increasing the temperature to 400° C. at a rate of 2° C. per min. The preform ceramic body was maintained at 400° C. for 1 hour before increasing the temperature to 500° C. at a rate of 8° C. per min. This temperature was maintained for 5 min before sintering the part by pulling a hard vacuum and then increasing the temperature to 1600° C. at a rate of 8° C. per min. The preform ceramic body was sintered at 1600° C. for 1 h and then 30 KSI nitrogen gas pressure was applied and held for 1 hour. The pressure was then released and the part recovered after air-cooling.

Physical property testing of the 0.638 in. by 0.638 in. by 0.266 in. part provided the following results:

Density: 15.6 g/cc [98.9% of theoretical density based on pure WC (15.77 g/cc)[a]]
Hardness (Rockwell A): 95.7
Hardness, Vickers (1 kg load, 15 second dwell): 2588 kg/mm$^2$
Carbon: 5.99 wt %
Mean Transverse rupture strength: >392,000 psi (n=2)

EXAMPLE 2

Densified polycrystalline tungsten carbide-containing ceramic bars were manufactured by the methods of the present invention using either Mach 400 ("material type-A"; Alldyne Powder Technology, West Huntsville, Ala., USA) or Mach 600 ("material type-B"; Alldyne Powder Technology, West Huntsville, Ala., USA). The transverse rupture strengths observed for material type-A and material type-B are summarized below in Table 1. Data are the mean±standard deviation of up to six determinations in each trial.

As shown in Table 1, the mean transverse rupture strengths of the ceramic bars exceeded 300,000 psi. There did not appear to be a significant difference in mean transverse rupture strength of ceramic bars produced using material type-A compared to the strength of ceramic bars produced using material type-B.

[a] Smitbell's Metals Reference Book, 6$^{th}$ Ed., pg. 23-1 (1983).

TABLE 1

| TRAVERSE RUPTURE STRENGTH TESTS | | | |
|---|---|---|---|
| Carmet Mach 600 set #53228 | TRS value (psi) | Carmet Mach 400 set #53229 | TRS value (psi) |
| bar 1 | 502,000 | bar 1 | 170,000 |
| bar 2 | 394,000 | bar 2 | 99,000 |
| bar 3 | 484,000 | bar 3 | 244,000 |
|  |  | bar 4 | 247,000 |
| average | 460,000 | average | 190,000 |
| s.d. +/− | 47,244 | s.d. +/− | 60,922 |
| Carmet Mach 600 set #53711 | TRS value (psi) | Carmet Mach 400 set #53709 | TRS value (psi) |
| bar 1 | 342,000 | bar 1 | 359,000 |
| bar 2 | 523,000 | bar 2 | 418,000 |
| bar 3 | 182,000 | bar 3 | 439,000 |
| bar 4 | 248,000 | bar 4 | 459,000 |
| average | 323,750 | average | 418,750 |
| s.d. +/− | 128,321 | s.d. +/− | 37,419 |
| Osram Mach 600 set #53711 | TRS value (psi) | Osram Mach 400 set #53709 | TRS value (psi) |
| bar 1 | 449,000 | bar 1 | 161,000 |
| bar 2 | 590,000 | bar 2 | 423,000 |
| bar 3 | 263,000 | bar 3 | 429,000 |
|  |  | bar 4 | 506,000 |
|  |  | bar 5 | 520,000 |
|  |  | bar 6 | 505,000 |
| average | 434,000 | average | 424,000 |
| s.d. +/− | 133,918 | s.d. +/− | 123,623 |

EQUIVALENTS

Although particular embodiments have been disclosed herein in detail, this has been done by way of example for purposes of illustration only, and is not intended to be limiting with respect to the scope of the appended claims, which follow. In particular, it is contemplated by the inventors that various substitutions, alterations, and modifications may be made to the invention without departing from the spirit and scope of the invention as defined by the claims. The choice of WC starting material, binder composition, and inert gas type are believed to be a matter of routine for a person of ordinary skill in the art with knowledge of the embodiments described herein. Other aspects, advantages, and modifications are considered to be within the scope of the following claims.

What is claimed is:

1. A method of manufacturing a densified ceramic body comprising:
    milling a mixture of tungsten-carbide particles and an organic solvent establishing a milling mixture;
    adding cobalt to the milling mixture;
    contacting the milling mixture with a binder material establishing a resultant binding mixture;
    granulating the resultant binding mixture into a population of substantially spherical granules;
    densifying a plurality of spherical granules into a preform ceramic body;
    removing the binding from the preform ceramic body at an elevated temperature, forming a debindered population of tungsten carbide particles in the perform; and
    sintering the debindered preform ceramic body to form a densified tungsten carbide containing body having a transverse rupture strength of at least about 300,000 pounds-per-square inch and a Rockwell A-scale hardness between about 95 and about 96 at 20° C.

2. The method according to claim 1, wherein the binder is selected from the group consisting of: a paraffin wax, an ester type wax, or a combination thereof.

3. The method according to claim 1, wherein milling comprises ball milling.

4. The method according to claim 1, wherein milling comprises attrition milling.

5. The method according to claim 1, wherein the tungsten carbide particles having a nominal average grain size of between about 0.001 μm to about 0.75 μm.

6. The method according to claim 1, wherein granulating comprises spray-drying.

7. The method according to claim 1, wherein prior to contacting the milling mixture with the binder, the process includes one or more repeated cycles spray drying the milling mixture then re-milling the resultant particles with an organic solvent.

8. The method according to claim 7, wherein cobalt is added in the first 5-10% of total milling time.

9. The method according to claim 1 or 7, wherein a total period of time for milling is greater that about 71 hours.

10. The method according to claim 1 or 7, wherein a total period of time for milling is between about 71 hours and about 400 hours.

11. The method according to claim 7, wherein a total period of time for milling is between about 150 hours and about 350 hours.

12. The method according to claim 7, wherein a total period of time for milling is between about 220 hours and about 240 hours.

13. The method of manufacturing a densified ceramic body according to claim 1, wherein debindering and sintering may be accomplished in a single cycle.

14. The method according to claim 1, further comprising adding a grain growth inhibitor to the milling mixture.

15. The method according to claim 14, wherein the grain growth inhibitor is added prior to completion of milling.

16. The method according to claim 14, wherein the grain growth inhibitor is selected from the group consisting of: vanadium carbide, chromium carbide, titanium carbide, tantalum carbide, molybdenum carbide, or combinations thereof.

17. The method according to claim 1, wherein the ratio of tungsten to carbon is about 94 parts by percent tungsten and about 6 parts by percent carbon.

18. The method according to claim 1, wherein after densification, the preform ceramic body includes a density of between 40% to 60% tungsten carbide.

19. The method according to claim 1, wherein the cobalt is added to the slurry at a time preferably in the first 5-10 percent of the total milling time.

20. The method according to claim 1, wherein cobalt is added by swedging the cobalt into the mixture.

21. The method according to claim 1, wherein densification comprises molding the spherical granules into a preform ceramic body and subjecting the preform ceramic body to an increasing temperature at a rate of at least about 3.5° C. per minute to at least about 280° C., and maintaining this temperature for at least about 45 minutes.

22. The method according to claim 21, wherein after the temperature of at least about 280° C. for at least about 45 minutes, the temperature is increased at a rate of at least about 1.5° C. per minute to at least 380° C. and maintaining this temperature for at least about 45 minutes.

23. The method according to claim 22, wherein after the temperature of at least about 380° C. is maintained for at least about 45 minutes, the temperature is increased at a rate of at least about 6° C. per min to at least about 480° C. and maintained at this temperature for at least about 3 minutes.

24. The method according to claim 1, wherein densification is carried out in an atmosphere of inert gas.

25. The method according to claim 1, wherein densification comprises molding the spherical granules into a preform ceramic body and subjecting the preform ceramic body to an increasing temperature at a rate of at least about 3.75° C. per minute to at least about 300° C., and maintaining this temperature for at least about an hour.

26. The method according to claim 25, wherein after the temperature of at least about 300° C. for at least about an hour, the temperature is increased at a rate of at least about 2° C. per minute to at least 400° C. and held at this temperature for at least about an hour.

27. The method according to claim 26, wherein after maintaining the temperature of at least about 400° C. for at least about an hour, the temperature is increased at a rate of at least about 8° C. per min to at least about 500° C.

28. The method according to claim 1, wherein sintering is accomplished at a temperature of at least about 1400° C.

29. The method according to claim 1, wherein sintering is accomplished by subjecting the densified preform ceramic body to a vacuum and an increasing temperature at a rate of about 6° C. up to about 1580° C., and maintaining this temperature for at least about 45 minutes.

30. The method according to claim 29, wherein sintering is completed by applying a pressure of inert gas to the ceramic body.

31. The method according to claim 30, wherein the inert gas is applied at a pressure of at least about 28 KSI.

32. The method according to claim 31, wherein the pressure of inert gas is held for at least about 45 minutes.

33. The method according to claim 30, wherein the inert gas is selected from the group consisting of: nitrogen, argon, helium, neon, krypton, xenon and combinations thereof.

34. The method according to claim 1, wherein the binder comprises less than about 5 weight percent of the resultant binding mixture.

35. The method according to claim 1, wherein the binder comprises about 2.25 weight percent of the resultant binding mixture.

36. The method according to claim 2, wherein the binder comprises a combination of ester and paraffin wax.

37. The method according to claim 36, wherein the paraffin wax comprises greater than about 0.1 weight percent of the resultant binding mixture.

38. The method according to claim 2, wherein the ester wax comprises less than about 5 weight percent of the resultant binding mixture.

* * * * *